United States Patent
Smith

(10) Patent No.: US 9,202,501 B2
(45) Date of Patent: Dec. 1, 2015

(54) SLIDER FOR MAGNETIC RECORDING APPARATUS WITH PROJECTION COMPRISING OPTICAL TURNING ELEMENT AND METHODS OF FABRICATION THEREOF

(71) Applicant: Seagate Technology LLC, Cupertino, CA (US)

(72) Inventor: Ralph Kevin Smith, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/967,824

(22) Filed: Aug. 15, 2013

(65) Prior Publication Data

US 2015/0049595 A1  Feb. 19, 2015

(51) Int. Cl.
G11B 11/00  (2006.01)
G11B 5/60  (2006.01)
G11B 5/31  (2006.01)
G11B 5/00  (2006.01)

(52) U.S. Cl.
CPC .............. *G11B 5/6088* (2013.01); *G11B 5/314* (2013.01); *G11B 5/3173* (2013.01); *G11B 2005/0021* (2013.01)

(58) Field of Classification Search
None
See application file for complete search history.

(56) References Cited

U.S. PATENT DOCUMENTS

| 6,404,706 B1 | 6/2002 | Stovall et al. |
| 6,873,576 B1 * | 3/2005 | Van Kesteren ............. 369/13.17 |
| 8,107,192 B2 | 1/2012 | Sasaki et al. |
| 8,107,326 B1 | 1/2012 | Hirano et al. |
| 8,225,482 B2 | 7/2012 | Suh et al. |
| 8,243,561 B2 | 8/2012 | Matsumoto |
| 8,254,212 B2 | 8/2012 | Snyder et al. |
| 8,339,905 B2 | 12/2012 | Rausch et al. |
| 8,345,517 B2 | 1/2013 | Hurley et al. |
| 8,379,494 B2 | 2/2013 | Peng et al. |
| 8,456,969 B1 | 6/2013 | Mooney et al. |
| 2007/0286031 A1 * | 12/2007 | Matsumoto ................ 369/13.13 |
| 2008/0056073 A1 | 3/2008 | Shimizu |
| 2008/0316872 A1 * | 12/2008 | Shimizu et al. ............ 369/13.24 |
| 2009/0207703 A1 * | 8/2009 | Matsumoto et al. ....... 369/13.33 |
| 2011/0013497 A1 | 1/2011 | Sasaki et al. |
| 2011/0058273 A1 | 3/2011 | Sasaki et al. |
| 2011/0103201 A1 * | 5/2011 | Peng et al. ................. 369/13.24 |
| 2011/0122735 A1 * | 5/2011 | Kato et al. ................. 369/13.14 |
| 2011/0217003 A1 * | 9/2011 | Gage et al. ...................... 385/30 |

(Continued)

FOREIGN PATENT DOCUMENTS

| JP | 2000173035 | 6/2000 |
| JP | 2008010093 | 1/2008 |

(Continued)

OTHER PUBLICATIONS

May 6, 2015, Office Action dated May 6, 2015 from Korean Application No. 10-2014-0105104, 6 pages.

*Primary Examiner* — Thang Tran
(74) *Attorney, Agent, or Firm* — Hollingsworth Davis, LLC

(57) ABSTRACT

An apparatus includes a slider, a light source disposed upon an outer surface of the slider and a projection extending above the outer surface of the slider. The light source comprises a resonant cavity aligned with the outer surface of the slider. The projection comprises an optical turning element that is optically coupled to the light source. Also included are methods of fabrication thereof.

13 Claims, 8 Drawing Sheets

(56) References Cited

U.S. PATENT DOCUMENTS

| | | | |
|---|---|---|---|
| 2011/0266469 A1 | 11/2011 | Goulakov et al. | |
| 2012/0026847 A1* | 2/2012 | Shindo et al. | 369/13.33 |
| 2012/0051195 A1* | 3/2012 | Shimizu | 369/13.17 |
| 2012/0201107 A1 | 8/2012 | Peng et al. | |
| 2013/0083637 A1* | 4/2013 | Peng | 369/13.24 |
| 2013/0142478 A1* | 6/2013 | Sluzewski et al. | 385/14 |
| 2013/0155400 A1* | 6/2013 | Nakao et al. | 356/237.2 |
| 2013/0279310 A1* | 10/2013 | Zhong et al. | 369/13.02 |

FOREIGN PATENT DOCUMENTS

| | | |
|---|---|---|
| JP | 2012234615 | 11/2012 |
| KR | 2011027414 | 3/2011 |

* cited by examiner

SLIDER FOR MAGNETIC RECORDING APPARATUS WITH PROJECTION COMPRISING OPTICAL TURNING ELEMENT AND METHODS OF FABRICATION THEREOF

SUMMARY

Embodiments are directed to an apparatus comprising a slider, a light source disposed upon an outer surface of the slider, and a projection extending above the outer surface of the slider. The light source includes a resonant optical cavity aligned substantially parallel to the outer surface of the slider. The projection includes an optical turning element that is optically coupled to the light source.

Other embodiments are directed to methods of fabricating the apparatus that includes a slider and a projection extending above the outer surface of the slider. One method comprises pattern depositing a plurality of waveguide elements upon a wafer, the plurality of waveguide elements comprising an optical turning element in a projection thereof, slicing the wafer to produce a slider bar that includes the plurality of waveguide elements, dicing the slider bar that includes the plurality of waveguide elements to produce slider bodies disposed upon the wafer; and pattern etching the slider bodies to produce a slider backpad having a projection extending above an outer surface, the projection comprising an optical turning element.

The above summary is not intended to describe each disclosed embodiment or every implementation of the present disclosure. The figures and the detailed description below more particularly exemplify illustrative embodiments

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
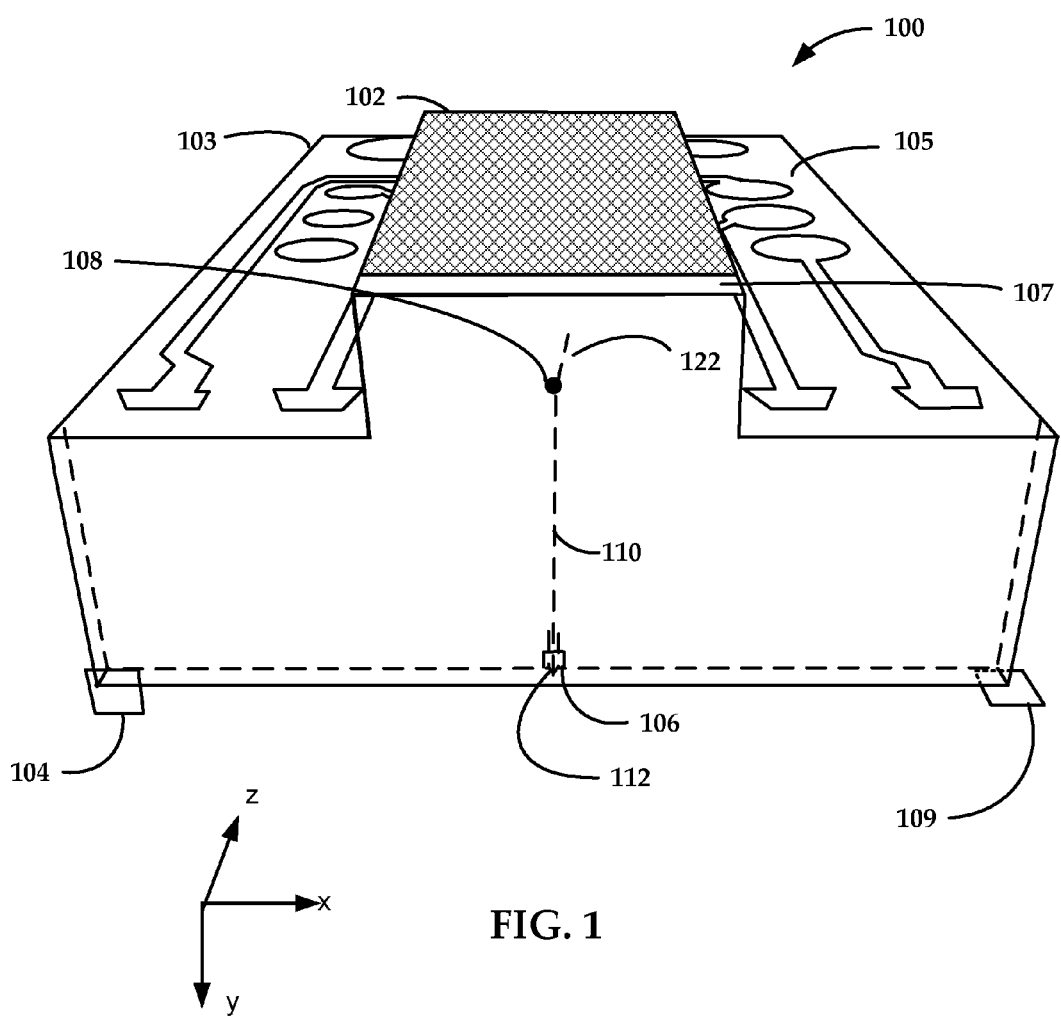
FIG. 1 is a perspective view of an embodiment of an apparatus that includes a disclosed slider.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various embodiments disclosed herein are generally directed to apparatuses and methods of fabrication of apparatuses that facilitate coupling of a laser diode to a magnetic writer that can be part of a magnetic write head. The apparatuses include a slider, a light source disposed upon an outer surface of the slider, and a projection extending above the outer surface of the slider. The light source includes a resonant optical cavity aligned substantially parallel to the outer surface of the slider. The projection has an optical turning element that is optically coupled to the light source.

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include lasers to deliver photonic energy to heat a small confined media area (spot size) at the same time the magnetic write head applies a magnetic field to the media for recording.

One way to achieve a tiny confined hot spot is to use an optical near-field transducer (NFT), such as a plasmonic optical antenna or an aperture, located near an air bearing surface of a hard drive slider. Light may be launched from a light source (e.g., a laser diode) into optics integrated into a slider. Such integrated optics can include a waveguide formed from core and cladding layers with high contrast between respective refractive indices. Light propagating in the waveguide may be directed to an optical focusing element, such as a planar solid immersion mirror (PSIM). The PSIM may concentrate the energy into a NFT. The NFT causes the energy to be delivered to the media in a very small spot.

A waveguide, NFT, and PSIM are integrated optical devices that can be formed within the slider. The field of integrated optics generally relates to the construction of optics devices on substrates, sometimes in combination with electronic components, to produce functional systems or subsystems. Light may be transferred between components via waveguides that are built up on a substrate using layer deposition techniques. These waveguides may be formed as a layer of materials, with a middle core layer having a relatively high refractive index, and top/bottom cladding layers of relatively low refractive index. Other optical components may be formed in similar fashion, including the NFT and PSIM discussed above.

In a HAMR slider, light is launched into these integrated optics components from a light source such as a laser diode.

One way to launch light into a slider is from an externally mounted laser via an optical waveguide or grating coupler fabricated in a slider. The light from the light source needs to have enough power to rapidly heat a small volume in a magnetic recording medium to reduce its coercivity so that a generated magnetic field can cause the magnetic medium in the small volume to align with the field before the media is cooled to increase its coercivity to lock in the magnetization. Laser power, in laser diodes for example, can be correlated to the length of the resonant optical cavity of the laser's optical system. One way to orient a laser to a slider is to have the optical resonant cavity of the laser aligned along an outer surface of the slider as shown in the accompanying drawings. The accompanying drawings show a slider that is aligned substantially parallel to the outer surface of the slider.

FIG. 1 is a perspective view of an embodiment of a HAMR apparatus 100 that includes a disclosed slider. HAMR apparatus 100 includes a HAMR slider 103. A light source, such as laser diode 102, is located on outer surface 105 of HAMR slider 103 proximate to trailing edge surface 104 of HAMR slider 103. Laser diode 102 delivers light proximate to read/write head 106, which has one edge on air-bearing surface (also referred to as "media-facing surface") 109 of HAMR slider 103. Media-facing surface 109 is held proximate to a moving media surface (not shown) during device operation.

Laser diode 102 provides electromagnetic energy to heat the media at a point near to read/write head 106. Optical coupling components, such as a waveguide 110, are formed integrally within HAMR slider 103 to deliver light from laser diode 102 to a recording medium. In particular, waveguide 110 and NFT 112 may be located proximate read/write head 106 to provide local heating of the media during write operations. Laser diode 102, in this example, may be an edge-emitting device; although it will be appreciated that waveguide 110 and NFT 112 may be used with any light source and light delivery mechanisms. For example, a surface-emitting laser (SEL) may be used instead of an edge emitting laser.

FIG. 1 shows laser diode 102 disposed upon outer surface 105 of HAMR slider 103. Laser diode 102 may be mounted external to the slider as shown in FIG. 1. Laser diode 102 includes a resonant optical cavity (not shown) aligned substantially parallel to outer surface 105 of HAMR slider 103. Light emanating from the resonant optical cavity of laser diode 102 can emerge from laser diode 102 and be injected into input waveguide 122 along a direction substantially parallel to outer surface 105. HAMR apparatus 100 includes projection 107 that extends above outer surface 105 of HAMR slider 103. In FIG. 1, projection 107 of HAMR slider 103 is an integral piece of HAMR slider 103 meaning that HAMR slider 103 and projection 107 are of a unitary construction (one piece) fabricated as described further herein. Projection 107 of HAMR slider 103 input waveguide 122 optical turning element 108, and input waveguide 122 optically coupled to the output of laser diode 102. Optical turning element 108 redirects light from input waveguide 122 into waveguide 110. Waveguide 110 is configured to direct energy from laser diode 102 to the recording medium. Optical turning element 108 can include a bent waveguide, a mirror, or any other optical element that redirects light from input waveguide 122 to waveguide 110. In the embodiment shown in FIG. 1, light is redirected in a direction substantially perpendicular to the surface of the slider, and is optically coupled so as to energize NFT 112.

A HAMR device utilizes the types of optical devices described above to heat a magnetic recording medium (e.g., hard disk) in order to overcome superparamagnetic effects that limit the areal data density of typical magnetic media. When writing to a HAMR medium, the light can be concentrated into a small hotspot over the track where writing takes place. The light propagates through waveguide 110 where it is coupled to NFT 112 either directly from the waveguide or by way of a focusing element. Other optical elements, such as couplers, mirrors, prisms, etc., may also be formed integral to the slider. The optical elements used in HAMR recording heads are generally referred to as integrated optics devices.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot is on the order of 50 nm or less. Thus the desired hot spot size is well below half the wavelength of the light. Optical focusers cannot be used to obtain the desired hot spot size, being diffraction limited at this scale. As a result, NFT 112 is employed to create a hotspot on the medium.

NFT 112 is a near-field optics device designed to reach local surface plasmon resonance at a designed wavelength. A waveguide 110 and/or other optical element concentrates light on a transducer region (e.g., focal point) where NFT 112 is located. NFT 112 is designed to achieve surface plasmon resonance in response to this concentration of light. At resonance, a high electric field surrounds NFT 112 due to the collective oscillations of electrons at the metal surface. Part of this field will tunnel into a storage medium and get absorbed, thereby raising the temperature of a spot on the media as it being recorded. NFTs generally have a surface that is made of a material that supports surface plasmons ("plasmonic metal") such as aluminum, gold, silver, copper, or alloys thereof. They may also have other materials but they must have a material that supports surface plasmons on their outer surface.

Figure 2:
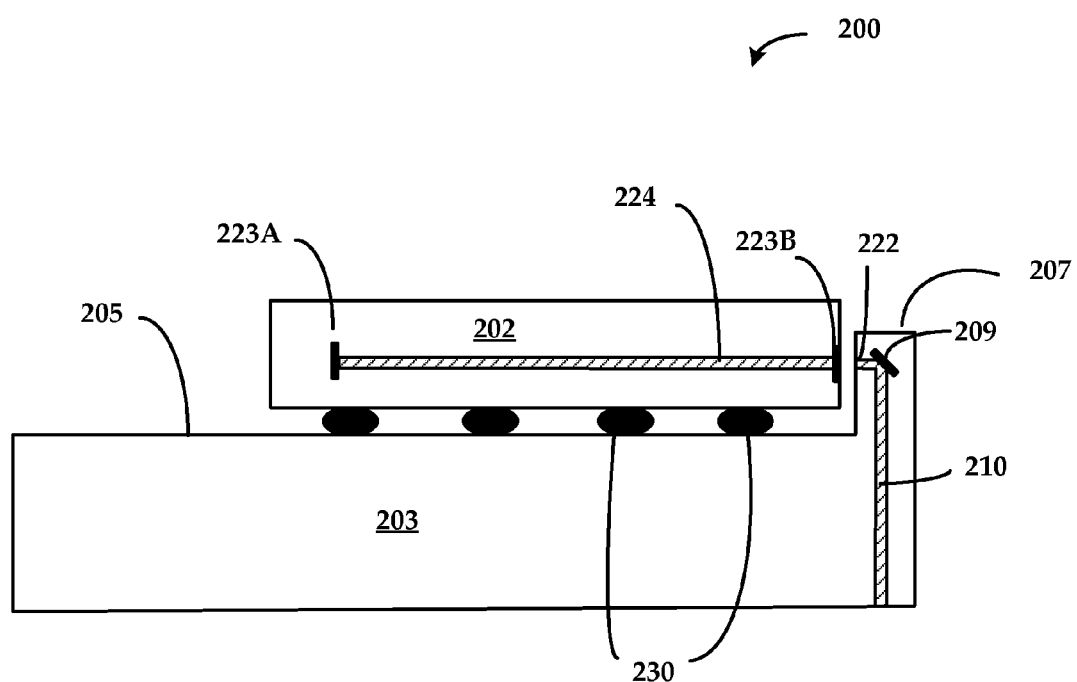
FIG. 2 is a more detailed side view of an embodiment of the apparatus shown in FIG. 1.

FIG. 2 is a more detailed side view of an embodiment of the HAMR apparatus shown in FIG. 1. HAMR apparatus 200 includes slider 203, laser diode 202 disposed upon outer surface 205 of slider 203, and projection 207 extending above outer surface 205 of slider 203. As shown in FIG. 2, projection 207 can be integral to slider 203 forming a single piece slider 203 that has a projection 207. Laser diode 202 includes resonant optical cavity 224 that, in this embodiment, has totally reflecting mirror 223A on one side and partially reflecting mirror 223B on the other side. Resonant optical cavity 224 is aligned along the outer surface 205 and may be aligned substantially parallel to outer surface 205 of slider 203. Light emanating from laser diode 202 is launched into input waveguide 222 of waveguide 210 in projection 207. Optical turning element 209 is configured to redirect light that is launched into input waveguide 222 from laser diode 202. For example, in some embodiments, the optical turning element may change the direction of the input light to a direction substantially perpendicular to resonant optical cavity 224 as shown in FIG. 2. In the embodiment shown in FIG. 2, waveguide 210 as well as optical turning element 207 are embedded in projection 207 and are fabricated to be integral to projection 207 as described in more detail below. The laser diode can be mechanically, thermally, and/or electrically coupled to the slider with reflow solder bumps 230. At least two solder bumps 230 disposed upon top surface 205 of slider 203 facilitate alignment between the output light of laser diode 202 and an input of waveguide 222 in response to a reflow of the at least two solder bumps.

Figure 3:
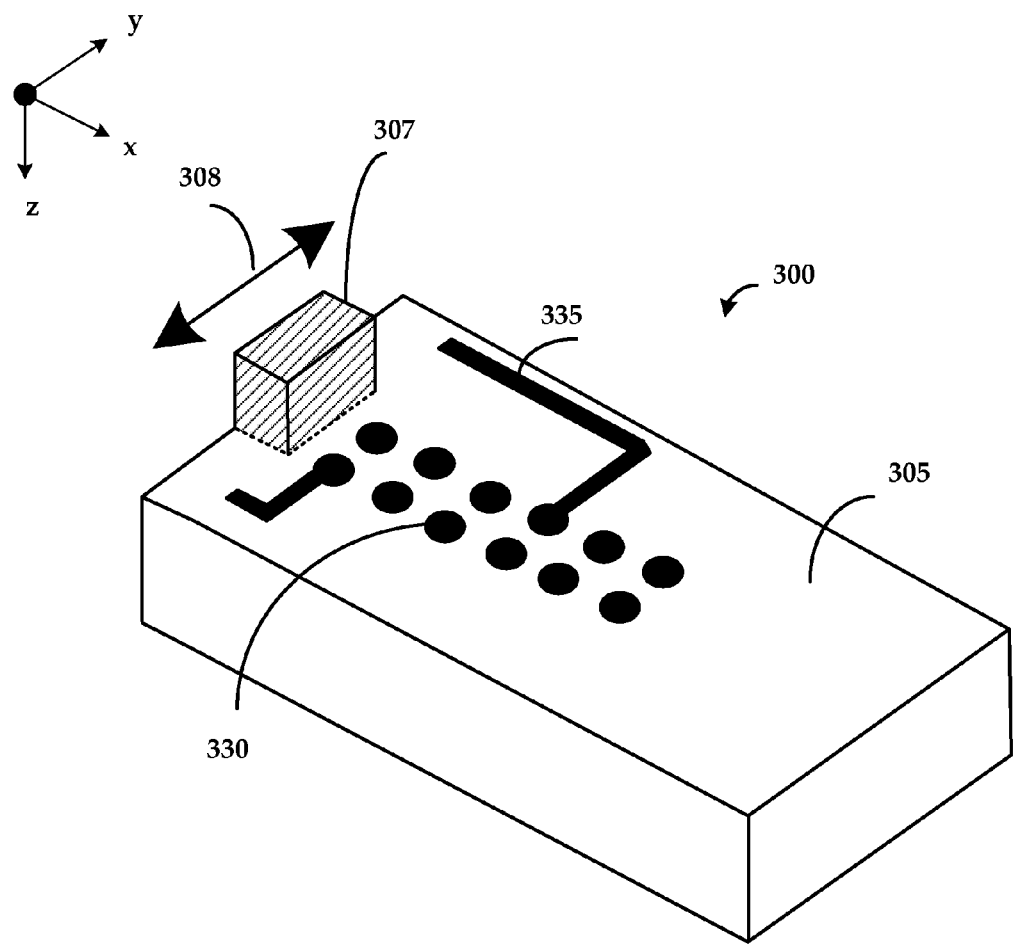
FIG. 3 is a perspective view of an embodiment of a disclosed slider having a projection extending above its outer surface.
Figure 4:
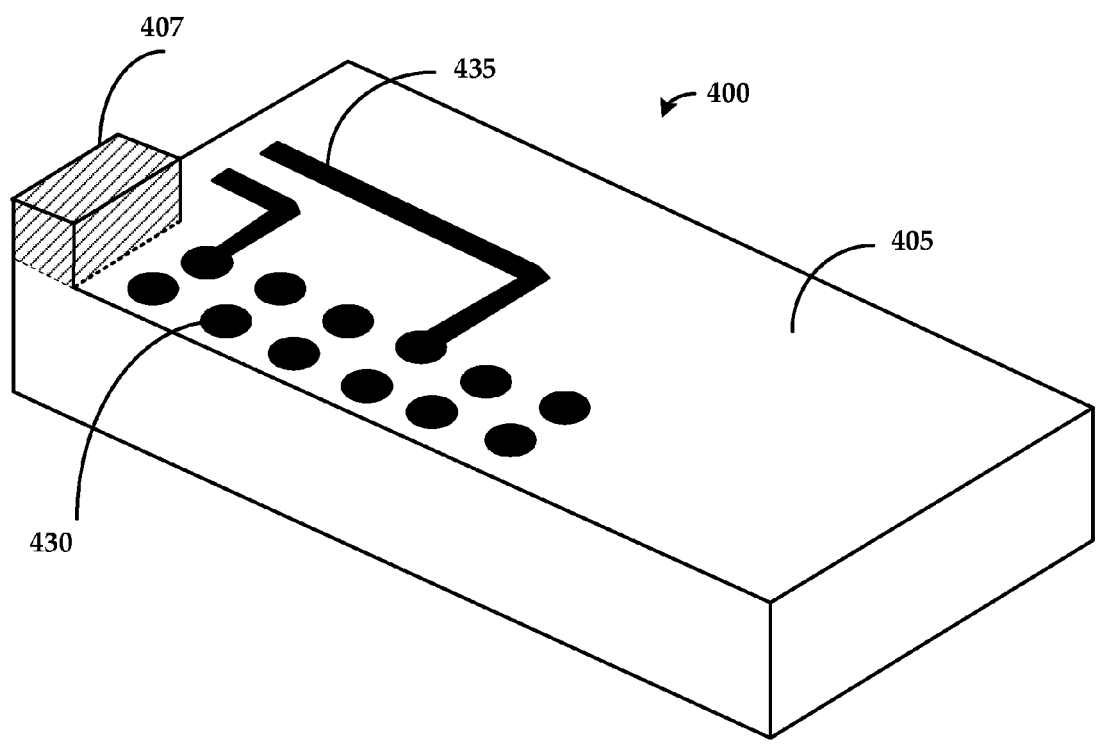
FIG. 4 is a perspective view of another embodiment of a disclosed slider having a projection extending above its outer surface.

FIGS. 3 and 4 are perspective views of two embodiments of a disclosed slider having a projection extending above its outer surface. FIG. 3 is an illustration of slider 300 that has outer surface 305. Slider 300 is part of an apparatus that includes a light source (not shown) and projection 307 that extends above outer surface of slider 300 as shown. In FIG. 3, projection 307 is located substantially in the middle of the width of slider 300. However, in other embodiments, projection 307 can be located anywhere along the width of slider 300 (along y-axis in FIG. 3) as shown by arrow 308. Solder bumps 330, some of which are attached to electrical traces 335, are in electrical, thermal, and/or mechanical communication with the laser diode (not shown). At least two solder bumps 330 can be used to self-align the laser diode to slider surface 305 in a vertical direction (along z-axis in FIG. 3), a horizontal direction (along x-axis in FIG. 3), or a combination thereof. The laser diode is aligned so that the optical turning element (which, in various embodiments, may include a bend in the waveguide or a mirror) is optically coupled to the laser diode.

FIG. 4 is an illustration of slider 400 that has outer surface 405. Slider 400 is part of an apparatus that includes a light source (not shown) and projection 407 that extends above outer surface of slider 400 as shown. In FIG. 4, projection 407 is located towards the edge of slider 400. Solder bumps 430 some of which are attached to electrical traces 435 are in electrical, thermal, and/or mechanical communication with the laser diode (not shown). At least two solder bumps 430 can be used to self-align the laser to slider surface 405.

In some embodiments, the projection of the apparatus can be located substantially in the center of the slider. In other embodiments, the projection of the apparatus can be located elsewhere along the width of the slider—not substantially in the center of the slider of the slider. In some other embodiments, the projection can extend across almost all of the width of the slider. Generally, there is no limitation to the position or the shape of the projection that extends above the outer surface of the slider. The shape of the projection can include cubic corners as shown in FIGS. 3 and 4 or, in other embodiments, can have rounded corners or any other shapes. The disclosed projection can extend above the outer surface of the slider and can include an optical turning element optically coupled to the light source.

Figure 5:
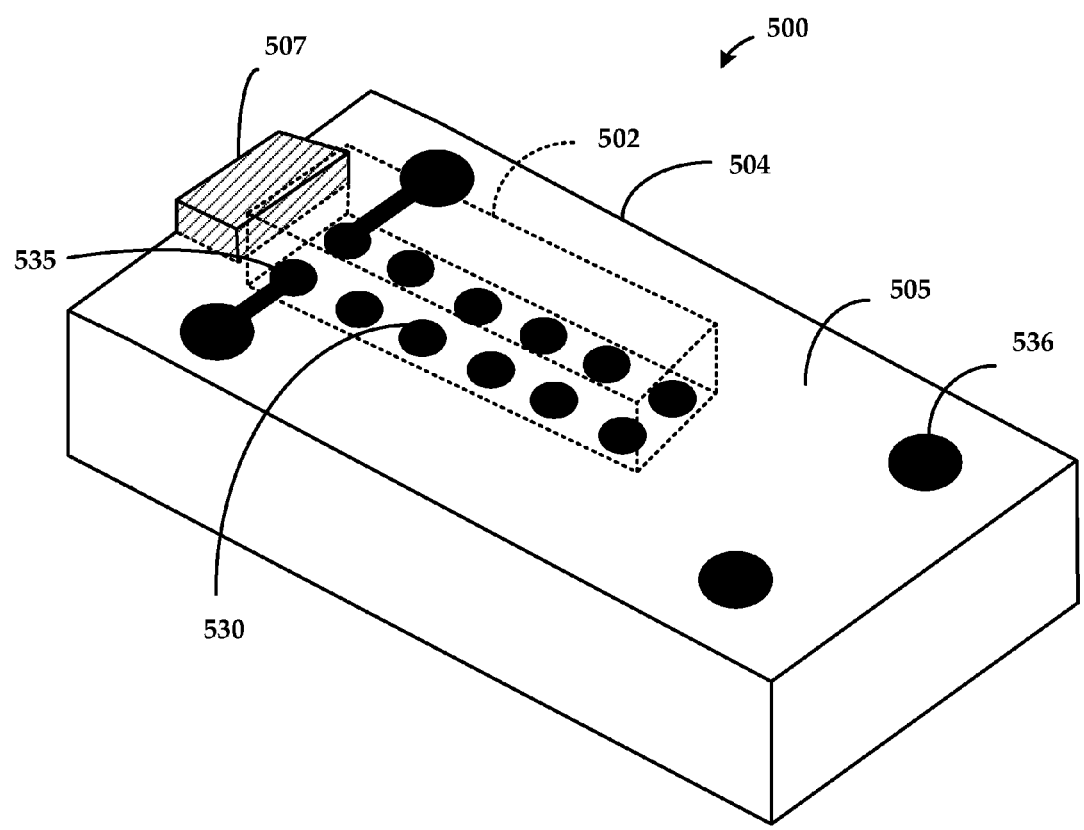
FIG. 5 is a perspective view of an embodiment of a disclosed apparatus.

FIG. 5 is a perspective view of another embodiment of a disclosed apparatus. FIG. 5 shows slider 504 having a slider surface (referred to as a backpad 505) that is part of apparatus 500. Laser diode 502 has been removed from apparatus 500 to show the position of the solder bumps. Apparatus 500 includes a slider 504, having slider backpad 505 that forms at least a portion of the outer surface of the slider. A projection 507 is arranged on the slider backpad 505. In some embodiments, projection 507 is an integral part of slider 504, such that the slider 504 and the projection 507 form a one-piece structure. Laser diode 502 (indicated in FIG. 5 by dotted lines between projection 507 and slider backpad 505) has a resonant optical cavity aligned substantially parallel to the slider backpad 505. Projection 507 extends above the outer surface of the slider backpad 505, and includes an optical turning element (not shown) optically coupled to laser diode 502. Solder bumps 530 on slider backpad 505 are used to provide electrical, mechanical, and/or thermal connections to laser diode 502. Some of the solder bumps (such as solder bump 535) include electrical traces. Interconnect pads 536 on slider backpad 505 allow for electrical, mechanical, and/or thermal coupling of apparatus 500 to other components of a HAMR system such as, for example, the recording head gimbal assembly.

In the disclosed apparatuses, the projection can be fabricated in situ during the fabrication of the slider. Portions of the slider can be made of, for example, silicon or AlTiC. The projection can be made of a high dielectric material such as alumina. As discussed above, the projection includes a waveguide and an optical turning element embedded within. The waveguide can be made of, for example, tantalum oxide.

Figure 6A:
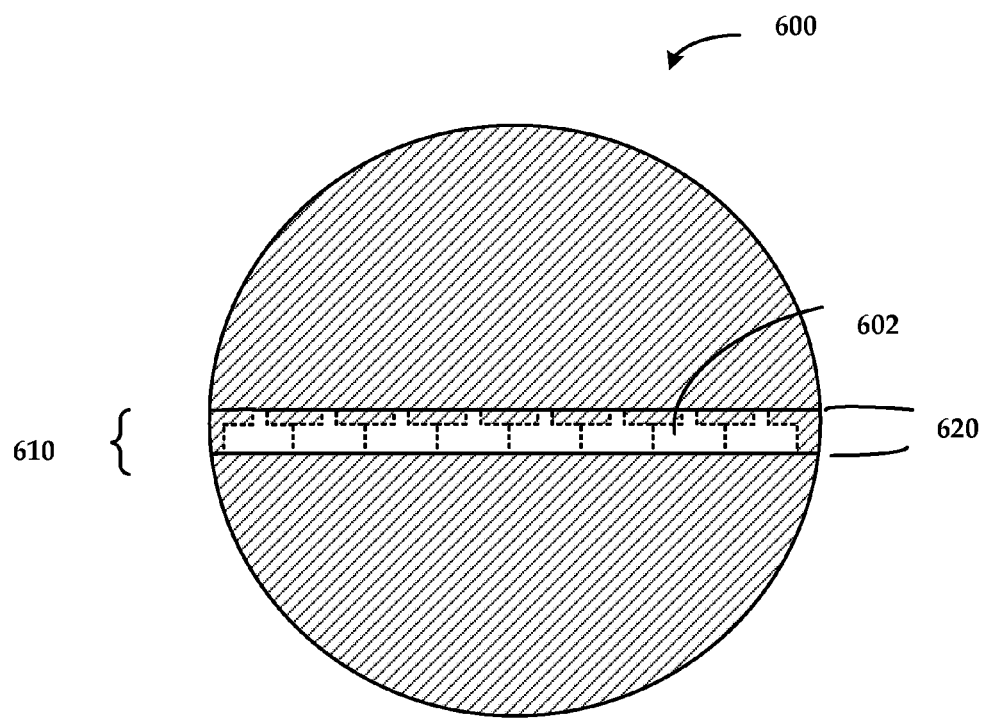
FIG. 6A is a plan view of an embodiment of a method of manufacture a disclosed slider.

FIG. 6A is a plan view of an embodiment of a method of manufacture of a disclosed slider. Wafer 600 (AlTiC or silicon) is patterned with a series of deposition layers to form what will become sliders, each having a projection with embedded waveguide and optical turning element extending above the outer surface of the slider after processing is finished. Repeated patterned layers of the future projection with embedded waveguide and optical turning element (referred to herein as projection waveguide elements) are formed on wafer 600 by patterning techniques such as photolithography followed by deposition or printing of patterned layers. Materials of various indices of refraction can be used to form the projection waveguide and/or the optical turning element that, in some embodiments, can be a redirected or bent waveguide.

Figure 6B:
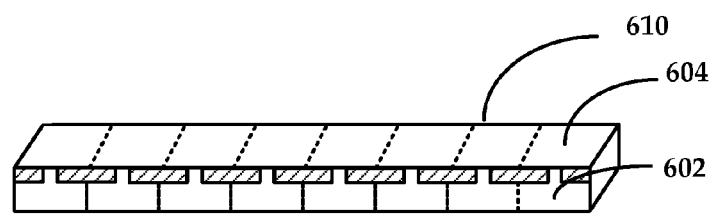
FIGS. 6B-6D are a perspective views an embodiment of a method of manufacture a disclosed slider.

A plurality of sliders 602 each including a projection portion with a set of projection waveguide elements can be patterned at the same time as shown in FIG. 6A. Although FIG. 6A depicts a series of seven patterns across wafer 600, many more patterns can be fit across a typical wafer. A series of these patterns can be cut from the wafer to form slider bar 610. In some embodiments, a slider bar can have from about 60 to about 70 sliders, each slider including a projection and set of projection waveguide elements. Wafer 600 can be sliced along lines 620 to separate slider bar 610 from the wafer. Slider bar 610 has a plurality of sliders 602 having projections on one end. The slider bar 610 includes a plurality of slider bodies 604 as shown in FIG. 6B.

Figures 6C, 6D:
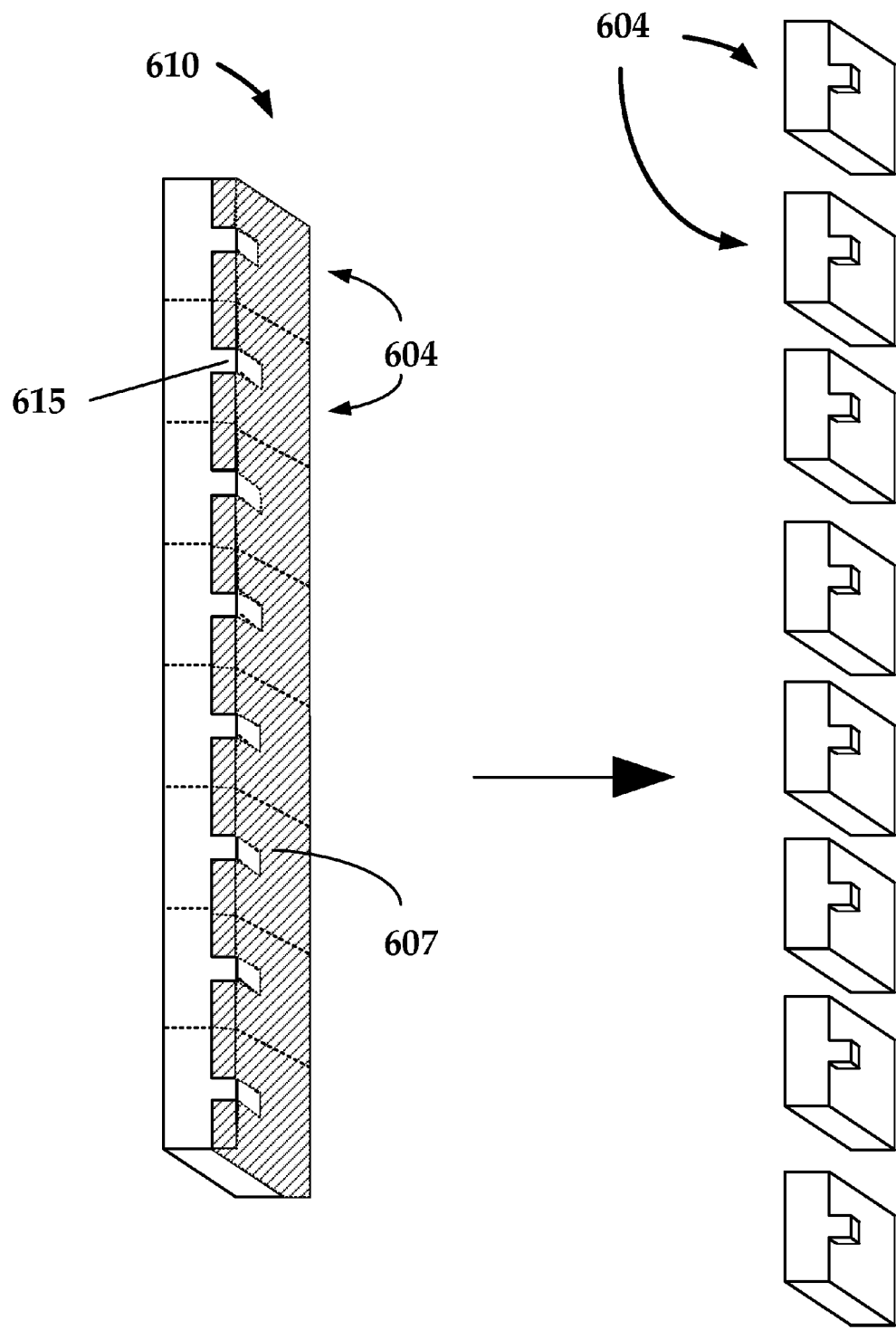

FIG. 6C shows slider bar 610 in a vertical orientation. Slider bar 610 includes a plurality of slider bodies 604. Area 615 on the face of slider body 604 shows an area that will eventually (after further processing) become the projection extending above the outer surface of the slider. Shaded area 607 can be removed from slider bar 610 followed by dicing to form individual slider bodies 604 as shown in FIG. 6D.

Fabrication methods for making disclosed apparatuses include pattern depositing a plurality of sliders upon a wafer, each slider including a projection having projection waveguide elements. The projection waveguide elements include, for example, a waveguide and an optical turning element. The projection waveguide elements can be formed as integral components within the projection. Further fabrication methods include slicing the wafer to produce a slider bar that includes the plurality of slider bodies with projections and projection waveguide elements; pattern etching the slider bodies to produce a slider having a projection extending above an outer surface; and dicing the slider bar that includes the plurality of sliders having the projection and projection waveguide elements to produce separate slider bodies.

In some embodiments, pattern depositing can include well-known photolithographic masking followed etching and/or deposition. Deposition can include evaporation, sputtering, plasma deposition, chemical vapor deposition, or other methods of depositing optical or electronic materials that are well known in the art. Pattern depositing also can include other methods of making patterned depositions of materials such as, three-dimensional printing. Pattern etching includes masking a portion of a substrate using photolithography or deposition of a mask material by any of the methods mentioned for deposition. Pattern depositing can include multiple steps of photolithography and deposition of waveguide and cladding materials that can be used to form the embedded waveguide and/or optical turning element. In some embodiments, the slider bodies can be slope etched to form the optical turning element. The etching can be done using ion etching, reactive ion etching, or other methods of removing materials well known in the art of integrated optics and electronics. Additionally, etching can be accomplished using a rastered ion beam.

Figure 7A:
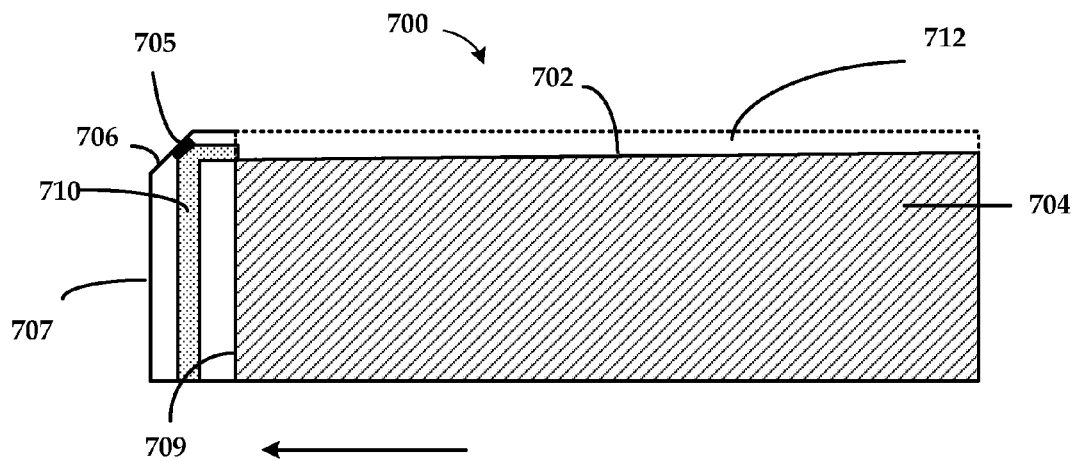
FIGS. 7A-7B are side views showing two embodiments of a method of fabrication of a disclosed slider.
Figure 7B:
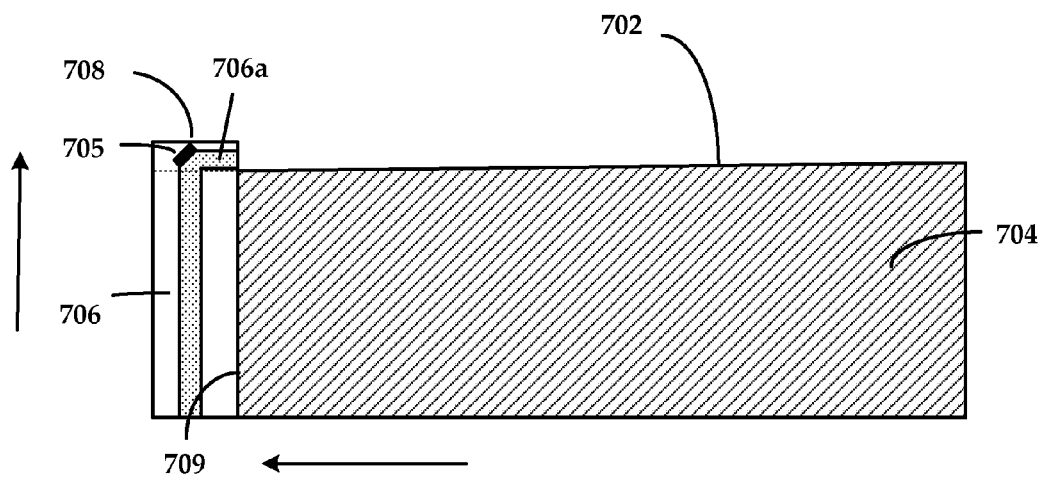

FIGS. 7A and 7B show subtractive and additive fabrication methods for the disclosed sliders. FIG. 7A shows slider body 704 that includes projection 707. Projection 707 includes waveguide 710 embedded within projection 707. Projection 707 also includes optical turning element 705. In some embodiments, optical turning element 705 can be on outer surface 706 of slider 700 as shown in FIG. 7A. During manufacturing, layers that form projection 707 including waveguide 710 and optical turning element 705 (a mirror in this embodiment) can be fabricated on top of slider body 704 by successive patterning and depositing of waveguide materials in a direction indicated by the arrow. To make the final slider body, patterned etching can be used to remove excess material 712 from slider body 704 to produce projection 707 that extends above the outer surface of the slider body 704 after etching.

FIG. 7B is a depiction of a method of making disclosed sliders by an additive method. Embedded waveguide 706 is fabricated by successive patterning and deposition of optical layers in the direction shown by the horizontal arrow as before. Embedded waveguide 706 is coplanar with an edge 709, e.g., trailing edge, of the slider 704. Projection 708 that includes optical turning element 705 is then formed by a series of patterned depositions in the direction shown by the vertical arrow in FIG. 7B so that projection 708 extends above slider outer surface 702 as shown. The projection 708 includes waveguide portion 706a that is substantially coplanar with the surface 702.

The disclosed apparatus includes a light source that includes a resonant optical cavity aligned substantially parallel to the outer surface of the slider. When the light source is a laser diode, this orientation allows for relatively long resonant optical cavities—and thus more power—than other orientations. In some embodiments, the projection can act as a stop for lateral alignment of the laser diode. The disclosed apparatus also includes a plurality of solder bumps disposed on a top surface of the slider. The solder bumps are configured to electrically, mechanically, and/or thermally couple light from a light source disposed upon an outer surface of the slider. At least two solder bumps disposed upon the top surface of the slider facilitate alignment between output light of the light source and an input of the waveguide in response to a reflow of the at least two solder bumps. The solder bumps allow for self-aligning of the light source with the input of the waveguide, for example in the vertical direction. The solder bumps can also help with horizontal alignment.

All references and publications cited herein are expressly incorporated herein by reference in their entirety into this disclosure except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

What is claimed is:

1. A slider, comprising:
    a top surface opposed to an air-bearing surface of the slider, the top surface configured to facilitate mounting of an edge-emitting light source such that, when the light source is mounted to the slider, a resonant optical cavity of the light source is aligned substantially parallel to the top surface of the slider and extends along a horizontal direction from a leading edge of the slider to a trailing edge of the slider; and
    a projection integral to the slider and extending above the top surface of the slider at the trailing edge, the projection and slider forming a seamless, unitary, and one-piece structure, the projection comprising;
        an input waveguide extending along the horizontal direction and receiving light emanating from the light source at an input surface of the projection that faces away from the trailing edge;
        an optical turning element configured to receive the light from the input waveguide and redirect the light in a vertical direction that is perpendicular to the horizontal direction; and
        a vertical waveguide that directs the light in the vertical direction towards the air-bearing surface.

2. A slider according to claim 1, wherein the optical turning element comprises a light directing mirror.

3. A slider according to claim 1, wherein the optical turning element comprises a mirror formed on an outer surface of the slider at an angle to the top surface and the trailing edge of the slider.

4. A slider according to claim 3, wherein at least a portion of the optical turning element extends above the top surface of the slider.

5. A slider according to claim 1, wherein the projection is configured to serve as a stop for alignment of the light source with the input waveguide.

6. A slider according to claim 1, wherein the slider comprises a plurality of solder bumps disposed on the top surface of the slider, the solder bumps configured to electrically, mechanically, and thermally couple the light source to the slider.

7. A slider according to claim 6, wherein at least two of the solder bumps facilitate alignment between the light source and the input waveguide in response to a reflow of the at least two solder bumps.

8. The slider of claim 1, wherein the projection is fabricated in situ during fabrication of the slider.

9. The slider of claim 8, wherein the projection is formed by pattern depositing the projection above the outer top surface.

10. The slider of claim 8, wherein the projection is formed by pattern etching to remove excess material, the pattern etching forming a backpad on the top surface, the backpad being configured to receive the light source.

11. The slider of claim 1, wherein the projection comprises a width that is less than a corresponding width of the slider, the width and the corresponding width being measured perpendicular to the vertical direction across the trailing edge of the slider.

12. An apparatus, comprising:
    an edge-emitting light source comprising a resonant optical cavity and an output end; and
    a slider comprising:
        a leading edge;
        a trailing edge opposed to the leading edge, a horizontal direction extending from the leading edge to the trailing edge;

an air-beating surface;
a top surface opposed to the air-beating surface, the top surface configured to facilitate mounting of the light source such that the resonant optical cavity is aligned substantially parallel to the top surface and extends along the horizontal direction; and
a projection extending above the top surface of the slider, the projection and slider forming a seamless, unitary, and one-piece structure, the projection comprising:
an input waveguide extending along the horizontal direction and receiving light emanating from the light source at an input surface of the projection that faces away from the trailing edge; and
an optical turning element configured to receive the light from the input waveguide and redirect the light in a vertical direction that is perpendicular to the horizontal direction; and
a vertical waveguide that directs the light in the vertical direction towards the air-beating surface.

13. The apparatus of claim 12, wherein the projection comprises a width that is less than a corresponding width of the slider, the width and the corresponding width being measured perpendicular to the vertical direction across the trailing edge of the slider.

* * * * *